United States Patent [19]

Hamaoka

[11] Patent Number: 4,924,333
[45] Date of Patent: May 8, 1990

[54] SEEK CONTROL APPARATUS AND METHOD FOR PREVENTING HEAD IN A FLOPPY DISK APPARATUS FROM BEING OUTWARDLY MOVED BEYOND AN OUTERMOST TRACK

[75] Inventor: Hiromi Hamaoka, Fuji, Japan

[73] Assignee: Kabushiki Kaisha Toshiba, Kawasaki, Japan

[21] Appl. No.: 238,248

[22] Filed: Aug. 30, 1988

[30] Foreign Application Priority Data

Aug. 31, 1987 [JP] Japan .................. 62-216615

[51] Int. Cl.⁵ ............................ G11B 21/02
[52] U.S. Cl. ................... 360/75; 360/78.11
[58] Field of Search ........... 360/25, 78.04, 78.11, 360/78.12, 78.13

[56] References Cited

U.S. PATENT DOCUMENTS 4,563,712 1/1986 Nishio et al. .............. 360/75
4,599,659 7/1986 Saito et al. ................ 360/75
4,686,590 8/1987 Kunii et al. ............... 360/75

OTHER PUBLICATIONS

Toshiba's Technical Material on Integrated Circuit FDMC-III TC8601F (JC-TC8601F-01).

Primary Examiner—Robert L. Richardson
Assistant Examiner—David L. Robertson
Attorney, Agent, or Firm—Cushman, Darby & Cushman

[57] ABSTRACT

A seek control device for use in a floppy disk apparatus, for performing a reverse seek operation to detect the zero track position on a magnetic disk as a reference for moving the magnetic head to a destination track on the magnetic disk. The device includes a driving section for seeking the zero track position in response to an input reverse seek instruction and for seeking a destination track position in response to an input forward seek instruction, a track zero signal generating section for generating a track zero signal when the magnetic head is on the zero track, and a seek control section. The seek control section determines if a seek error has occurred, and in response, temporarily interrupts the input seek operation, generates forward drive instructions until the track zero detection signal has been turned off, generates a reverse drive instruction to the driving section in order to seek the zero track position, and then continues with the input seek operation.

11 Claims, 4 Drawing Sheets

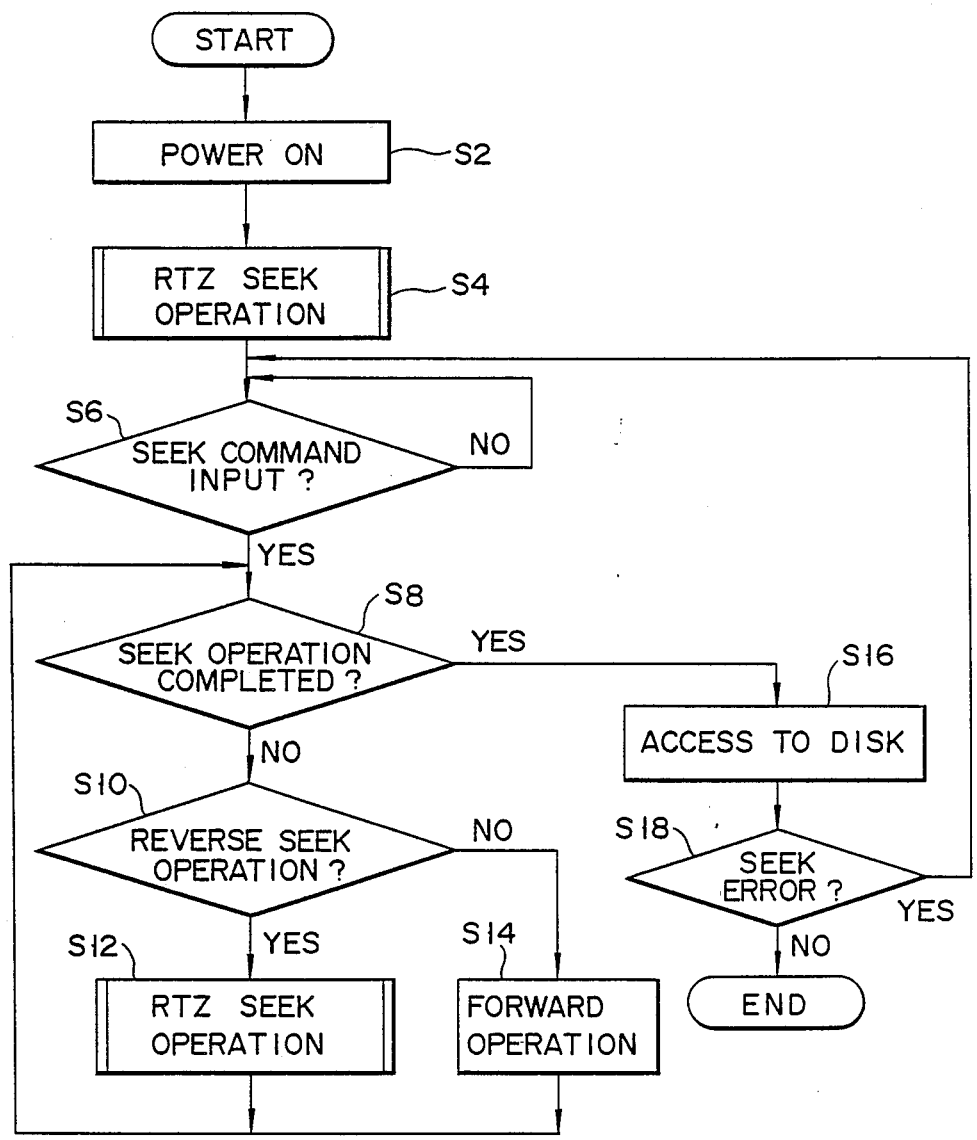
F I G. 4

SEEK CONTROL APPARATUS AND METHOD FOR PREVENTING HEAD IN A FLOPPY DISK APPARATUS FROM BEING OUTWARDLY MOVED BEYOND AN OUTERMOST TRACK

BACKGROUND OF THE INVENTION

1. Field of the Invention

This invention relates to a seek control device and a seek control method used in a floppy disk apparatus to perform a return-to-zero (RTZ) operation when a seek error occurs.

2. Description of the Related Art

In the prior art floppy disk apparatus, as shown in FIG. 1, a magnetic head mounted on carriage 10 is driven in a radial direction along a magnetic recording medium (disk) by means of lead screw mechanism 13 for converting the rotational motion of stepping motor 12 to a linear motion. The disk is rotated while it is clamped on spindle hub 11 of a spindle mechanism. When a seek command is generated, the magnetic head is moved to a destination track with respect to an outermost track used as a reference track. That is, when the seek command is generated, a return-to-zero (RTZ) operation is first performed such that the magnetic head seeks the zero track in an outer direction along the recording medium, and the destination track is then sought by the magnetic head from an inner direction along the recording medium, after the zero track is detected.

In the prior art floppy disk apparatus, when the power source is turned on, the seek command is also generated, and the RTZ seek operation is performed to seek the zero track using a step signal from a host side (which includes a Floppy Disk Controller, FDC). The position of the magnetic head when the power is turned on is not previously determined, and for this reason, the RTZ seek operation is performed. Whether the magnetic head has reached the zero track is detected by track zero detector 20 shown in FIG. 2. When track zero (TZ) detection tab 21 attached to carriage 10 is detected by detector 20 during the RTZ operation, track zero detector 20 generates a TZ detection signal. The control circuit Floppy Disk Mechanism Controller, (FDMC) of the floppy disk apparatus generates and supplies a track zero signal to the host side in response to the TZ detection signal from detector 20. Then, the host side interrupts generation of the step pulse signal required for the RTZ operation.

As described above, the seek control is performed with respect to the zero track as the reference track. In a case where a seek error occurs, carriage 10 is driven further outwardly (− direction) along the disk from the zero track. In order to prevent the carriage 10 from being driven past the zero track, as shown in FIG. 1, a track zero (TZ) stopper 14 is mounted on lead screw mechanism 13 of the prior art floppy disk apparatus. More specifically, carriage 10 is mechanically prevented from being further driven in the − direction from the zero track by means of TZ stopper 14, even when a seek error has occurred. However, a position adjusting step is necessary to properly mount TZ stopper 14, and the step of mounting TZ stopper 14 increases the number of the assembling steps of the floppy disk apparatus. Further, mechanical distortion will occur due to the overshooting of the carriage each time the RTZ seek operation is performed, thereby adversely affecting positioning precision.

SUMMARY OF THE INVENTION

An object of this invention is to provide a seek control device and method for a floppy disk apparatus in which the magnetic head can be precisely set to the zero track without using the track zero (TZ) stopper, even when a seek error occurs, and resultantly reducing the number of assembling steps.

This object can be attained using a seek control device in a floppy disk apparatus comprising a driving section, a track zero detector, and controller.

The driving section reversely drives the magnetic head in a − direction in response to an input reverse drive instruction and forwardly drives the magnetic head in a + direction in response to an input forward drive instruction. The track zero detector detects whether the magnetic head is positioned on the zero track, and selectively generates a track zero detection signal in accordance with the detected result. The controller, responsive to an input seek command, checks in accordance with the track zero detection signal from the track zero detector whether a seek error has occurred, selectively generates a forward drive instruction if a seek error has occurred to output the forward drive instruction to the driving section, and generates and outputs to the driving section a reverse drive instruction and a forward drive instruction, occurring subsequent to a reverse drive instruction in accordance with the track zero detection signal.

As described above, according to this invention, the magnetic head always can be correctly set to the zero track without using a TZ stopper, even when a seek error occurs. In other words, the TZ stopper can be omitted and the step of mounting the TZ stopper can be omitted, thus making it possible to reduce the number of assembling steps. Further, parts corresponding to the TZ stopper can also be omitted, thus reducing the total number of parts in the floppy disk device.

BRIEF DESCRIPTION OF THE DRAWINGS

FIG. 4 is a flowchart illustrating the operation of the seek control device shown in FIG. 3.

DETAILED DESCRIPTION OF THE PREFERRED EMBODIMENTS

A seek control device according to one embodiment of this invention will now be described with reference to the accompanying drawings.

Figure 3:
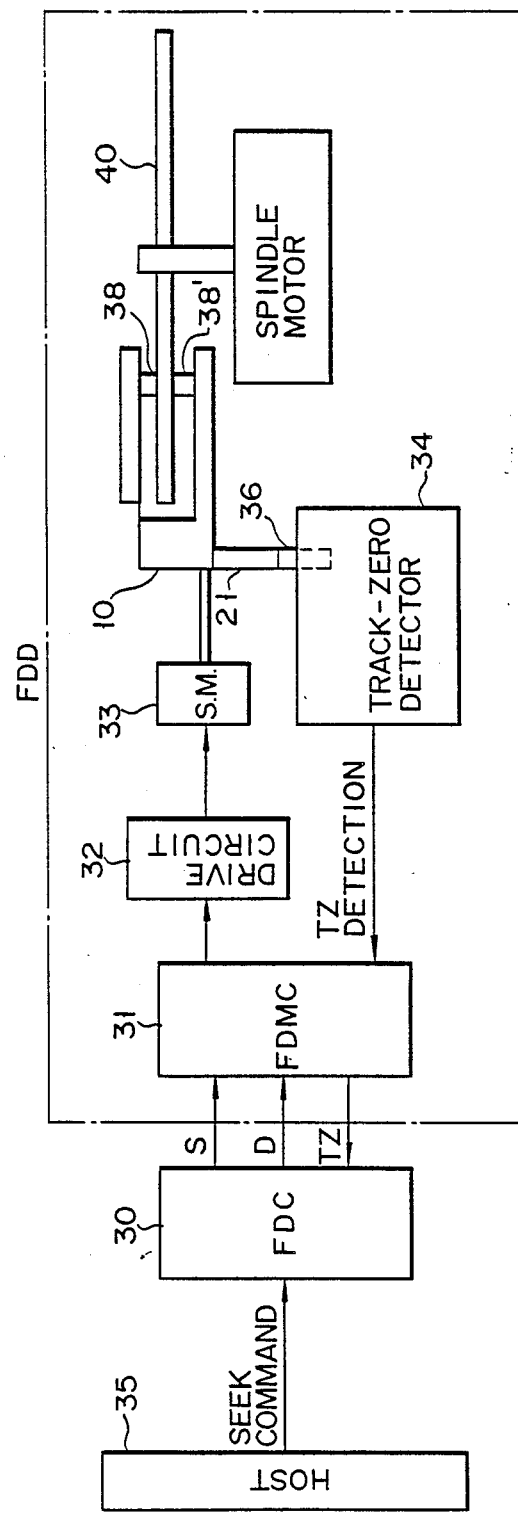
FIG. 3 is a block diagram showing the configuration of a seek control device according to one embodiment of this invention.

First, referring to FIG. 3, the configuration of the seek control device will be explained. As shown in FIG. 3, floppy disk controller (FDC) 30 supplies a reserve seek instruction including step pulse signal S, direction signal D and the like to floppy disk mechanism controller (FDMC) 31 in response to a seek command output from host 35. Controller 31 generates a drive control signal to control the mechanical operation of the floppy disk drive (FDD) in response to signals S and D from FDC 30. For example, Toshiba TC8601F can be used as FDMC 31.

Figure 1:
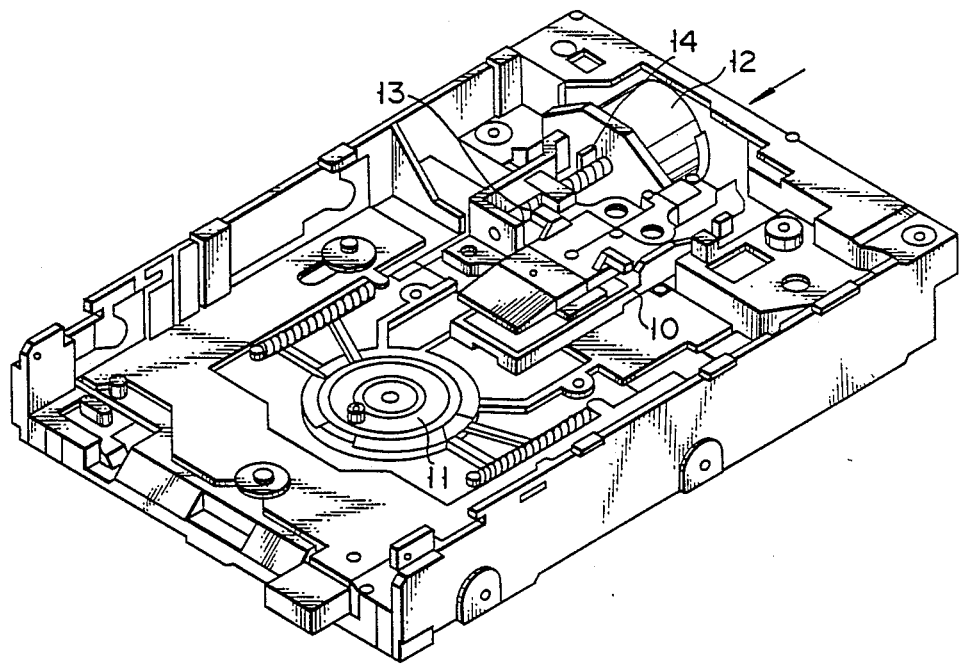
FIG. 1 is a perspective view showing the construction of the prior art floppy disk apparatus.

Drive circuit 32 drives stepping motor 33 to move carriage 10 according to the drive control signal from controller 31. Thus, the seek operation of magnetic heads 38 and 38' mounted on the carriage can be controlled. In this embodiment, stopper 14, as shown in FIG. 1, is removed.

Figure 2:
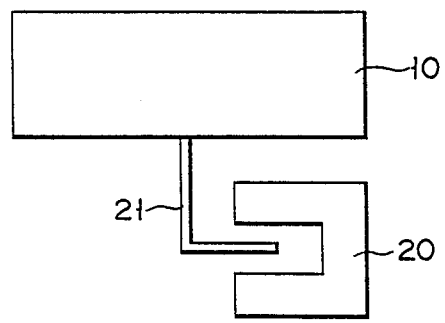
FIG. 2 is a side elevational view showing the positional relation between the conventional carriage and track zero sensor.

Track zero detector 34 has the same construction as detector 20 shown in FIG. 2, and supplies TZ detection signal to controller 31 when the detector 34 detects tab 36. Controller 31 supplies a signal TZ of the ON state to FDC 30 in response to the TZ detection signal from detector 34. When receiving ON state signal TZ, FDC 30 supplies a forward seek instruction including signals S and D and the like to controller 31.

Next, the operation of the seek control device shown in FIG. 3 will be explained with reference to FIGS. 4 and 5.

First, when the power source of the floppy disk apparatus is turned on, as shown in step S2 of FIG. 4, the positions of the magnetic heads on disk 40 are not yet determined. Therefore, FDC 30 supplies a reverse seek instruction, including step pulse signal S and direction signal D, to controller 31. Signal S is used for driving stepping motor 33, and in general, motor 33 is driven such that heads 38 and 38' are moved by one track in response to one pulse of signal S. Signal D is a signal indicating the moving direction (inwardly and outwardly along the disk) of the magnetic heads. Controller 31 first generates a reverse drive control signal in response to the reverse seek instruction to perform the RTZ seek operation according to the reverse seek instruction from FDC 30 (step S4).

Figure 5:
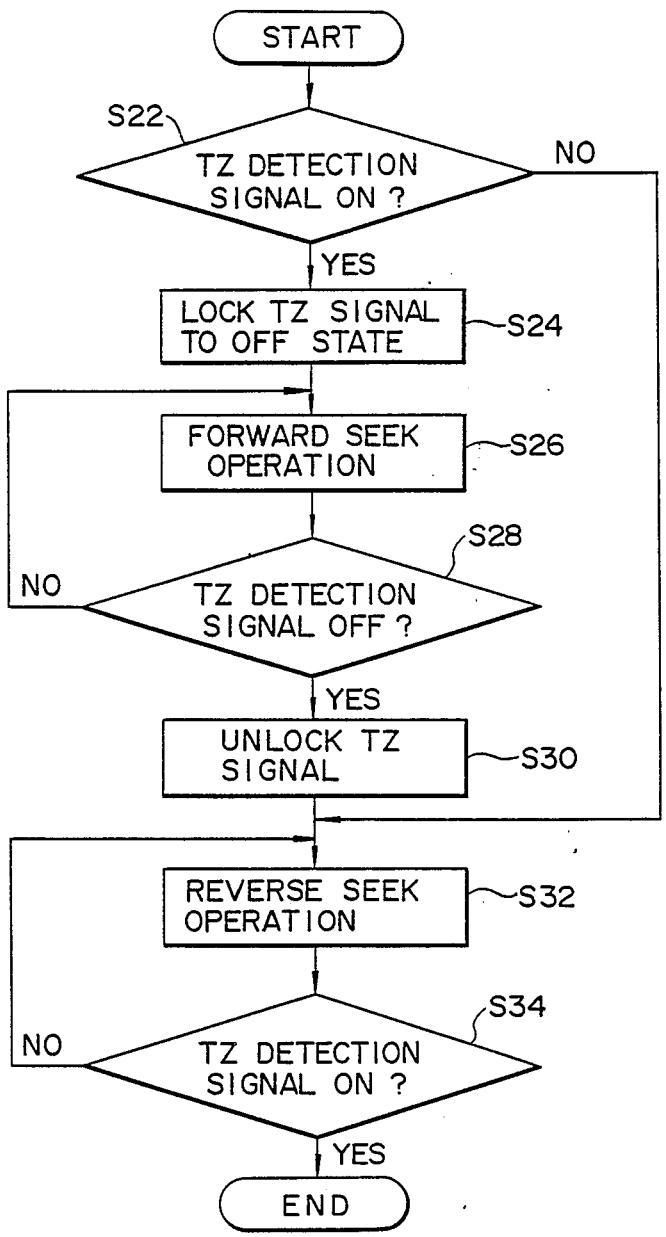
FIG. 5 is a flowchart for illustrating the RTZ seek operation which is shown in part of the flowchart shown in FIG. 4.

As shown in FIG. 5, in the RTZ seek operation, FDMC 31 checks in step S22 whether the TZ detection signal is set at the ON level. If "NO" in step 22, then step S32 is executed. If "YES" in step S22, that is, if TZ detection tab 36 is already at track zero detector 34 when the reverse seek instruction is input to FDMC 31, it is determined by FDMC 31 that a seek error has occurred, and step S24 is performed. In step S24, the TZ signal is locked in the OFF state by FDMC 31, and FDC 30 is locked in the state generating the reverse seek instruction.

At this time, direction signal D and step signal S are ignored by FDMC 31. This is because the magnetic head is on the zero track, and the reverse drive control signal for moving the magnetic head outwardly must not be generated. Since, in the prior art floppy disk apparatus, TZ stopper 14 is mounted as shown in FIG. 1, the magnetic head (mounted on carriage 10) is mechanically prevented from further being moved outwardly from the zero track.

However, as described before, in this embodiment, the FDD, in which the TZ stopper has been removed, is used and is designed to lock the track zero signal in the OFF state. Therefore, a forward (inward) seek operation is performed in steps S26 and S28, ignoring the reverse seek instruction from FDC 30, until the TZ detection signal goes to the OFF state, when a seek error has occurred. When it is detected by FDMC 31 in step S28 that the TZ detection signal goes to the OFF state, the TZ signal is released from the locked state by FDMC 31. In this case, the reverse seek instruction is made effective, and the reverse drive control signal is generated by FDMC 31 again based on direction signal D and step signal S. In steps S32 and S34, the reverse (outward) seek operation is performed until the TZ detection signal goes to the ON state. When it is determined by FDMC 31 that the TZ detection signal goes to the ON state, the RTZ seek operation is completed. That is, in a case where "YES" is obtained in step S22, i.e., the TZ detection signal is at the ON state from the beginning, step signal S and direction signal D are ignored, and a forward seek operation is first performed. Then, the normal reverse seek operation is performed in steps S32 and S34, where the magnetic disk is reversely driven to the zero track of the disk.

After the initial RTZ seek operation is performed when the power source is turned on, it is checked in step S6 whether a seek command has been input or not. If a seek command has been output from host 35 to FDC 30, FDC 30 checks in step S8 whether the seek operation has been completed or not. IF "NO" in step S8, FDC 30 checks in step S10 whether a reverse seek operation is to be performed or not. In order to seek the destination track, it is necessary to detect the zero track, and therefore a reverse seek operation is first performed. For this purpose, a reverse seek instruction, including step pulse signal S and direction signal D, is supplied from FDC 30 to controller 31, and the same RTZ seek operation as in step S4 is performed in step S12.

When the TZ detection signal is generated from track zero detector 34, controller 31 supplies a TZ signal to FDC 30. Then, FDC 30 generates a forward seek instruction in response to the TZ signal in order to perform the forward seek operation for seeking the destination track. That is, step pulse signal S and direction signal D, necessary for the forward seek operation, are supplied to controller 31. In this way, the forward seek operation is performed for the magnetic head to seek the destination track in step S14. Thus, the normal seek operation for seeking the destination track with respect to the zero track as a reference track can be attained by performing the RTZ seek operation as described above.

Then, step S8 is performed again in order to check whether or not the seek control operation generated by the seek command is complete. Since, in this case, the answer is "YES", the read/write operation is performed in step S16. If, at this time, the magnetic head is not correctly positioned at the destination track, it is determined by FDC 30 that a seek error has occurred. Then, host 35 generates again the same seek command as that described before, and the seek control operation defined by steps S6 to S14 is performed.

As described above, in this invention, when a seek error has occurred, the RTZ seek control is performed by the magnetic head in order to seek the zero track without fail. Therefore, TZ stopper 14 which is required for the prior art FDD can be omitted.

In the above embodiment, the forward seek operation is performed until the TZ detection signal is set to the OFF level. However, it is also possible to forwardly drive the magnetic head by a predetermined number of tracks.

I claim:
1. A seek control device, comprising:
a carriage mechanism including a head and a tab, said head assessing a recording medium, said recording medium having a reference track at an outermost track of the recording medium;

driving means for moving said head in an outer direction along said recording medium in response to an input first drive control signal to cause said head to seek the reference track and for moving said head in an inner direction along said recording medium in response to an input second drive control signal to cause said head to seek a destination track;

detecting means for detecting said tab to determine whether said head is positioned on the reference track, and for generating a reference track detection signal when the detecting means detects that said head is positioned on the reference track;

first control means for sequentially generating outer and inner driving instructions in response to an input seek command for moving said head to the destination track; and second control means for (1) generating and outputting the first and second drive control signals to said driving means, in response to the outer and inner direction driving instructions, respectively, and for (2) interrupting the outer driving instruction generated by said first control means and generating and outputting the second drive control signal to said driving means, in response to the reference track detection signal from said detecting means.

2. A device according to claim 1, wherein said second control means includes means for generating the second drive control signal and the outer direction driving instruction in response to the reference track detection signal until the tab is not detected by said detecting means.

3. A device according to claim 1, wherein said second control means includes means for generating the second drive control signal and the outer direction driving instruction in response to the reference track detection signal to move said head for a predetermined number of tracks in the inner direction along said recording medium.

4. A seek control method for moving a head with respect to a reference track of a recording medium to a destination track, comprising the steps of:

moving the head in response to a drive control instruction;

sequentially generating outer and inner direction drive instructions as the drive control instruction in response to a seek command for respectively moving the head in outer and inner directions along the recording medium;

determining whether the head is positioned on the reference track; and generating the inner direction drive instruction as the drive control instruction regardless of the outer direction drive instruction when (1) the head is determined to be positioned on the reference track and (2) the outer direction drive instruction is generated.

5. A method according to claim 4, wherein said step of moving the head includes moving a carriage and a tab with the head in response to the drive control signal and said step of determining where the head is positioned includes detecting the tab to determine whether the head is positioned on the reference track.

6. A method according to claim 5, wherein said step of generating the inner direction drive instruction includes generating the inner direction drive instruction as the drive control instruction until the tab is not detected.

7. A method according to claim 4, wherein said step of generating the inner direction drive instruction includes generating the inner direction drive instruction as the drive control instruction to move the head by a predetermined number of tracks in the inner direction along the recording medium.

8. A seek control apparatus, comprising:

a carriage mechanism including a head and a tab, said head accessing a recording medium, said recording medium having a reference track at an outermost track of the recording medium;

moving means for moving said head in response to an input drive control instruction;

first generating means for sequentially generating outer and inner direction drive instructions as the drive control instruction in response to an input seek command for respectively moving the head in outer and inner directions along the recording medium;

determination means for determining whether the head is positioned on the reference track; and second generating means for generating the inner direction drive instruction as the drive control instruction regardless of the outer direction drive instruction from said first generating means when (1) said determination means determines that the head is positioned on the reference track and (2) the outer direction drive instruction is input from said first generating means.

9. An apparatus according to claim 8, wherein said determination means includes means for detecting said tab to determine whether said head is positioned on the reference track.

10. An apparatus according to claim 9, wherein said second generating means includes means for generating the inner direction drive instruction as the drive control instruction until said tab is not detected by said determination means.

11. An apparatus according to claim 8, wherein said second generating means includes means for generating the inner direction drive instruction as the drive control instruction to move said head by a predetermined number of tracks in the inner direction along the recording medium.

* * * * *